United States Patent [19]

Miyaou et al.

[11] Patent Number: 4,841,524
[45] Date of Patent: Jun. 20, 1989

[54] DIGITAL DATA MULTIPLE CONVERSION SYSTEM FOR CONVERTING DATA HAVING A FREQUENCY TO DATA HAVING ANOTHER FREQUENCY BY A DIGITAL STUFFING METHOD

[75] Inventors: Hirohisa Miyaou, Yokohama; Takahiro Furukawa, Oyama; Toru Kosugi, Omiya, all of Japan

[73] Assignee: Fujitsu Limited, Kawasaki, Japan

[21] Appl. No.: 169,217

[22] Filed: Mar. 16, 1988

[30] Foreign Application Priority Data

Mar. 16, 1987 [JP] Japan .................. 62-060424

[51] Int. Cl.⁴ ........................... H04J 3/04
[52] U.S. Cl. .............................. 370/112
[58] Field of Search ............ 370/112, 102, 84; 375/118, 119, 120; 360/54

[56] References Cited

U.S. PATENT DOCUMENTS 4,353,129 10/1982 Nishiwaki ................. 360/54
4,759,041 7/1988 Anderson et al. ........... 375/118

Primary Examiner—Robert L. Griffin
Assistant Examiner—Wellington Chin
Attorney, Agent, or Firm—Staas & Halsey

[57] ABSTRACT

A digital data multiple conversion system which can be used in a digital data communication network and recover lost clock pulses. The system includes a memory unit storing input data having N bits, a first frequency divider frequency-dividing an input clock having a first frequency at N to output a first frequency-divided signal, a first pulse width expansion circuit connected to receive m frequency divided pulses from the first frequency divider, where m indicates the number of lost pulses of the input clock plus one receiving the input clock, and outputting a first pulse width expanded signal of the input clock having an m+1 pulse width, a circuit outputting a read clock having a second frequency near to the the first frequency and stuffing the read clock, a second frequency divider frequency-dividing the read clock at N to output a second frequency-divided signal, a second pulse width expansion circuit connected to receive n frequency divided pulses from the second frequency divider, where n indicates the number of lost pulses of the read clock plus one, receiving the read clock, and outputting a second width expanded signal of the read clock having an n+1 pulse width; a phase detector outputting a phase detection signal when the phases of both pulse width expanded signals coincide, and a stuffing request circuit outputting a stuffing request signal to the stuffing circuit. The stuffing circuit stuffs the read clock in response to the stuffing request signal.

6 Claims, 15 Drawing Sheets

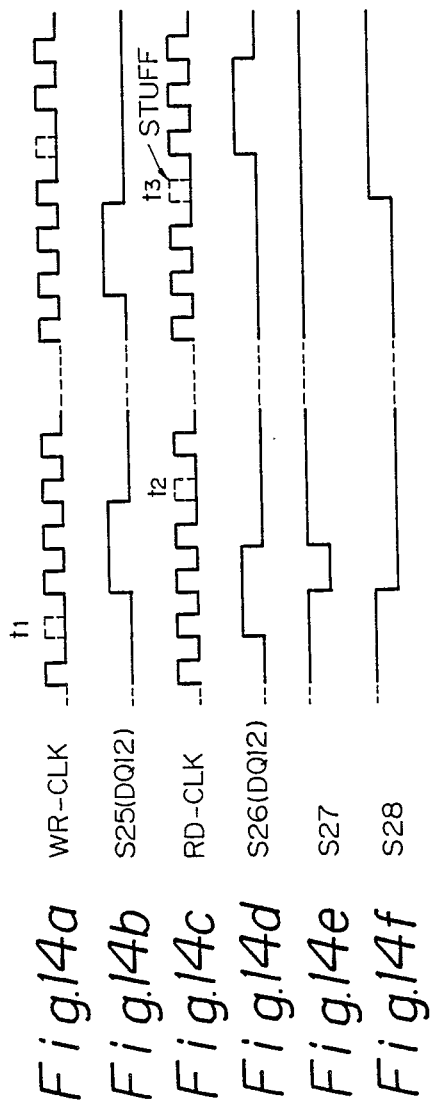

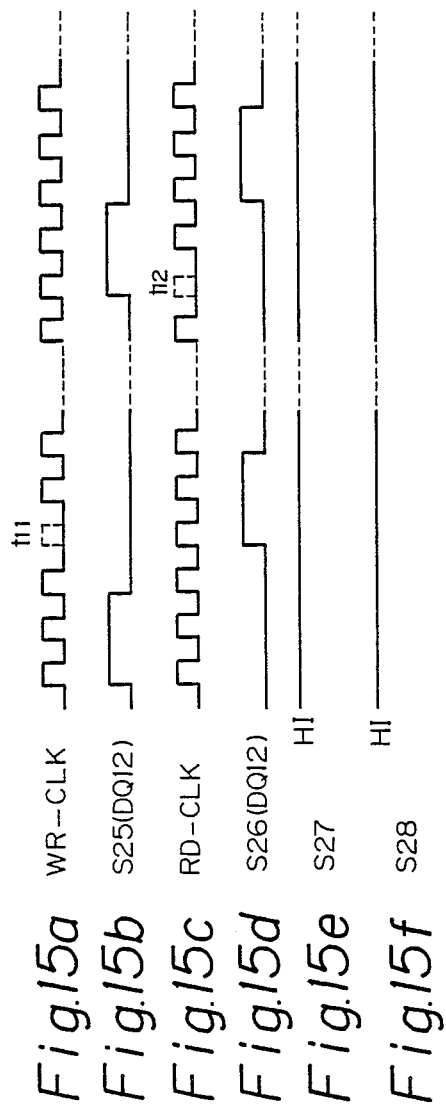

DIGITAL DATA MULTIPLE CONVERSION SYSTEM FOR CONVERTING DATA HAVING A FREQUENCY TO DATA HAVING ANOTHER FREQUENCY BY A DIGITAL STUFFING METHOD

BACKGROUND OF THE INVENTION

1. Field of the Invention

The present invention relates to a system for a multiple-conversion of digital data having one frequency to digital data having another frequency. More particularly, it relates to a system for a multiple-conversion of digital data having a frequency of, for example, 1.544 MHz, at a first order group in a digital data communication system, to digital data having another frequency of, for example, 6.312 MHz, at a second order group in the digital data communication by using a digital stuffing method.

The digital data multiple conversion system of the present invention is preferably used in terminal equipment in the digital data communication system.

2. Description of the Related Art

Recent advanced digital data communication networks can be constructed in a hierarchy structure, and such a digital data communication network comprises first to fifth order groups. Note, occasionally, a digital data communication network will comprise a one and a half (1.5) order group. In short distance data communication, data issued from a data processing equipment is multiplexed at an exchange office, fed to a transmission line of the first order group through the exchange office, further multiplexed at a terminal equipment, and then fed to a transmission line of the second order group. When the data approaches a target data processing equipment, the data on the transmission line of the second order group is demultiplexed at another terminal equipment, fed to a transmission line of the first order group different to the above first order group transmission line, demultiplexed at another exchange office, and finally transferred to the target data processing equipment. If longer distance data communications are required, transmission lines of higher order groups, for example, the third order group and the fourth order group, can be used for the data transfer.

The data transfer speeds are as follows: 1.544 Megabit-per-seconds (Mbps) for the first order group; 3.152 Mbps for the 1.5 order group; 6.312 Mbps for the second order group; approximately 32 Mbps for the third order group; approximately 98 Mbps for the fourth order group; and, approximately 400 Mbps for the fifth order group. The relationship of the data transfer speed between the first and 1.5 order groups is approximately 1:2, approximately 1:4 between the first and second order groups, approximately 1:2 between the 1.5 and second order groups, and so on. Therefore, for example, the data on the transmission line of the first order group is multiplexed at a 1:4 relationship at the terminal provided between the first and second order groups, and fed to the transmission line of the second order group, and transferred at 6.312 Mbps.

However, the relationship of the data transfer speed is not a fine integer. For example, a four time multiple of the first order group's transfer speed of 1.544 Mbps is 6.176 Mbps, but the transfer speed of the second order group is 6.312 Mbps. This irregular relationship of the data transfer speed lying between two groups is based upon a difference of the provision of redundant data in each group, which must be inserted for data transfer and is defined by a data format of each group.

Upon multiplexing or demultiplexing, the problem of the above irregular relationship of the data transfer speed, i.e., an irregular relationship of a frequency between two groups, may be solved by providing a phase-locked-loop (PLL) circuit, because a PLL circuit can continuously change the frequency. However, the provision of the PLL circuit necessitates a complicated circuit structure and high costs.

Also, stuffing, which bypasses data multiplexing or data demultiplexing under certain conditions, can be applied to adjust the above irregular frequency relationship. However, a prior art multiplexing or demultiplexing still suffers from a disadvantage of an irregular multiplexing or demultiplexing due to an omission of pulses. This will be described later with reference to the drawings.

SUMMARY OF THE INVENTION

An object of the present invention is to provide a digital data multiplexing conversion system by which data having one frequency is converted to data having another frequency, the relationship of which does not involve an integer, all data is multiplexed, and the construction is simplified.

Another object of the present invention is also to provide a digital demultiplexing conversion system having similar features to the above digital data multiple conversion system.

According to the present invention, there is provided a digital data multiplexing-demultiplexing system including; a memory unit receiving and storing input data having N bits; a first frequency divider receiving an input clock having a first frequency and frequency-dividing the input clock at N to output a first frequency-divided signal; a first pulse width expansion circuit connected to receive a plurality of frequency divided pulses which indicate at least start and end frequency divided pulses from the first frequency divider, receiving the input clock and outputting a first pulse width expanded signal of the input clock, a pulse width thereof corresponding to a number of lost pulse of the input clock plus one, a circuit outputting a read clock having a second frequency near to the first frequency and stuffing the read clock; a second frequency divider receiving the read clock and frequency-dividing the read clock at N to output a second frequency-divided signal; a second pulse width expansion circuit connected to receive a plurality of frequency divided pulses which indicate at least start and end frequency divided pulses from the second frequency divider, receiving the read clock, and outputting a second pulse width expanded signal of the read clock, a pulse width thereof corresponding to a number of lost pulses of the read clock plus one; a phase detector receiving the first and second pulse width expanded signals, and outputting a phase detection signal when the phases of both pulse width expanded signals coincide; and a stuffing request circuit receiving the phase detection signal, and outputting a stuffing request signal to the stuffing circuit. The memory unit storing the input data in response to the first frequency-divided signal, and outputting the stored data to the stuffing circuit in response to the second frequency-divided signal. The stuffing circuit stuffs the read clock in response to the stuffing request signal.

The plurality of frequency divided pulses from the first frequency divider may include m consecutive frequency divided pulses starting with a start frequency divided pulse during each frequency dividing period of the first frequency divider, where m indicates a number of lost pulses of the input clock plus one, and thus the pulse width of the first pulse width expanded signal may have an m +1 pulse width. Also, the plurality of frequency divided pulses from the second frequency divider may include n consecutive frequency divided pulses starting with a start frequency divided pulse during each frequency dividing period of the second frequency divider, where n indicates a number of lost pulses of the read clock plus one, and thus the pulse width of the second pulse width expanded signal may have an n +1 pulse width.

BRIEF DESCRIPTION OF THE DRAWINGS

Other objects and features of the present invention will be described below in detail with reference to the accompanying drawings, in which:

FIGS. 9a to 9m are timing charts explaining the operation of the frequency divider shown in FIG. 8;

FIGS. 12a to 12c are timing charts explaining the operation of the pulse width expansion circuit shown in FIG. 11;

FIGS. 14a to 14f and 15a 15f, are timing charts explaining the operation of the digital data multiple conversion system shown in FIG. 7;

DESCRIPTION OF THE PREFERRED EMBODIMENTS

Figure 1:
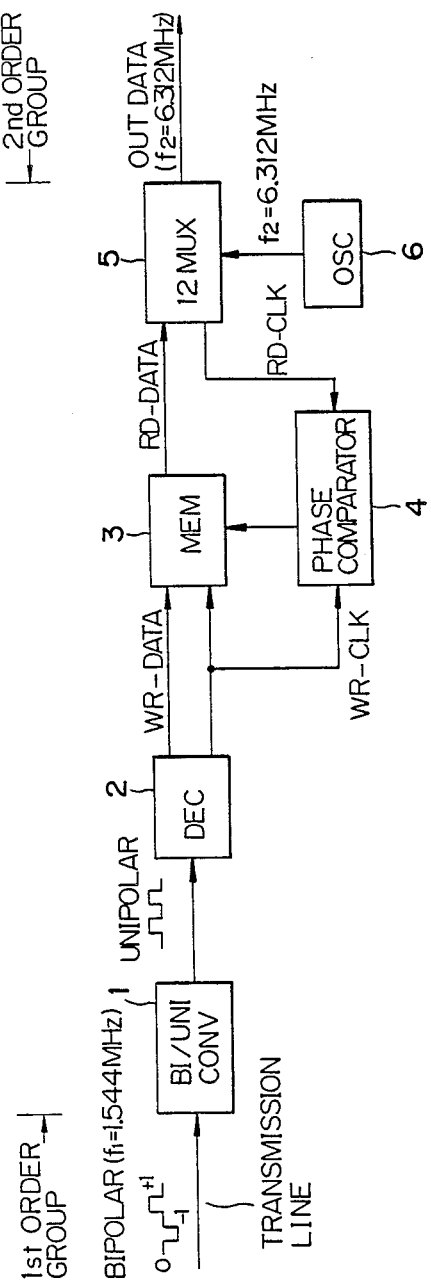
FIG. 1 is a block diagram of an example of a digital data processing system in which a digital data multiple conversion system of the present invention can be applied.

First, an example of a digital data multiplexing system provided in a terminal equipment installed between a first order group and a second order group in a digital communication network, in which a digital data multiple conversion system of the present invention is applied, will be described with reference to FIG. 1. A bipolar-to-unipolar conversion circuit 1 receives a bipolar signal varying among a zero level, a positive level, and a negative level and having a frequency $f_1 = 1.544$ MHz, and outputs a unipolar signal on a transmission line of the first order group. A decoder 2 receives the unipolar signal, extracts write clocks WR-CLK of the frequency $f_1$ in response to a change of the unipolar signal, and outputs write data WR-DATA. A 12 multiplexer 5, which indicates the data multiplexing from the data of the first order group to data of the second order group, receives a signal having a frequency $f_2 = 6.312$ MHz output from an oscillator 6, and outputs a read clock RD-CLK having a frequency $f_1'$ which is obtained by frequency dividing the frequency $f_2$ by four. A memory 3 stores the write data WR-DATA therein in response to the write clock WR-CLK. A phase comparator 4 compares the phases of the write clocks WR-CLK and the read clocks RD-CLK and outputs read pulses to the memory 3, outputting read data RD-DATA. The read data RD-DATA is multiplexed together with other three read data output from three other memories (not shown) corresponding to the memory 3. The multiplexed data OUT DATA having the frequency $f_2 = 6.312$ MHz is output to a transmission line of the second order group and then transferred.

Before describing the preferred embodiment of the present invention, an example of a prior art digital data multiple conversion system will be described with reference to FIG. 2.

Figure 2:
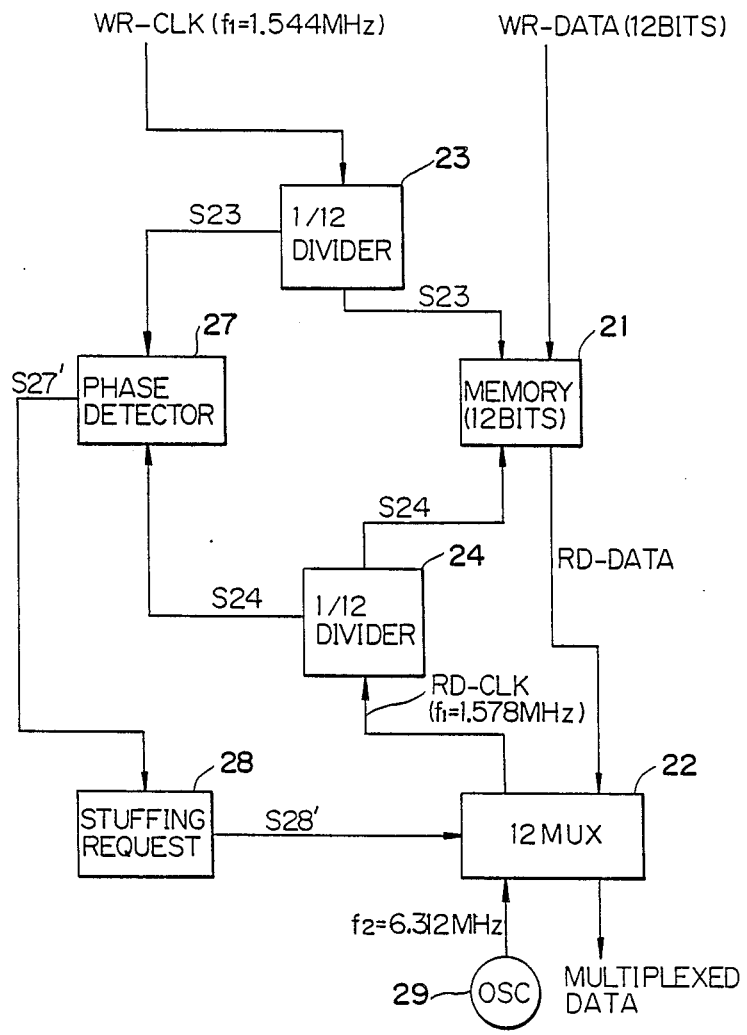
FIG. 2 is a diagram, of an example of a prior art digital data multiple conversion system.
Figure 3:
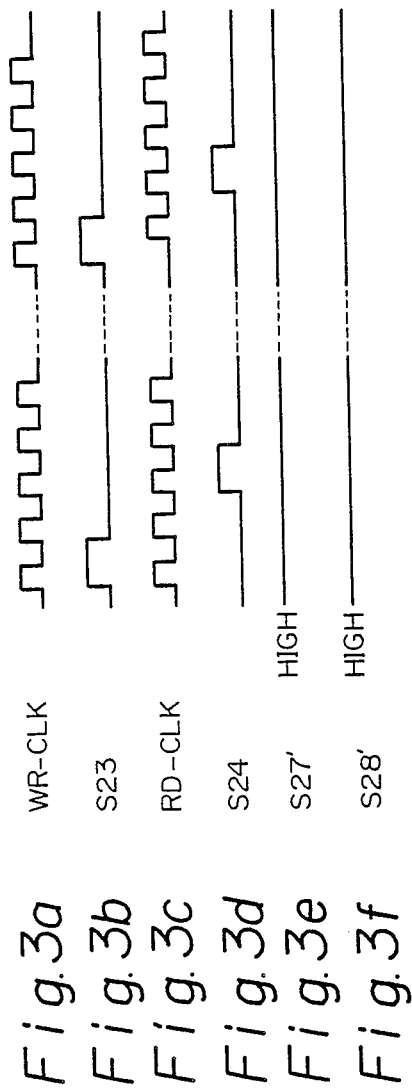
FIGS. 3a to 3f, 4a to 4f, 5a to 5f, and 6a to 6f are timing charts explaining the operation of the digital data multiple conversion system shown in FIG. 2.

The digital data multiple conversion system shown in FIG. 2 receives write data WR-DATA of 12 bits and having a bit rate of 1.544 Mbps, and outputs multiplexed data having a bit rate of 6.312 MHz. The digital data multiple conversion system includes a memory 21 having a 12 bits length register, a first frequency divider 23, a phase detector 27, a second frequency divider 24, and a stuffing request circuit 28. Four of these circuits can be provided in parallel and connected to a 12 multiplexer 22. The digital data multiple conversion system also includes the 12 multiplexer 22 and an oscillator 29 outputting a signal having a frequency of $f_2 = 6.312$ MHz.

The write data WR-DATA is a serial data of 12 bits and is serially stored into the memory 21. A read data WR-DATA output from the memory 21 also is a serial 12 bits data, and thus the memory 21 comprises a 12 bit shift register. The first frequency divider 23 receives a write clock WR-CLK having a frequency of $f_1 = 1.544$ MHz and frequency-divides that clock at 12, to output a divided signal S23 to the memory 21. The 12 multiplexer 22 receives the signal having a frequency $f_2 = 6.312$ MHz and a read clock RD-CLK having a frequency $f_1'$, which is the signal having the frequency $f_2$ frequency-divided by four and thus is 1.578 MHz. The second frequency divider 24 also frequency-divides the read clock RD-CLK at 12, to output a divided signal S24 to the memory 21. Accordingly, the memory 21 stores the serial write data WR-DATA of 12 bits in response to the divided signal S23. The memory 21 also outputs the stored data as the serial read data RD-DATA to the 12 multiplexer 22 in response to the divided signal S24. The phase detector 27 receives the first and second divided signals S23 and S24 and outputs a phase detection signal S25' when both received divided signals S23 and S24 are time-coincided. The phase detection signal S27' has a pulse width corresponding to an overlapped time of both of the received divided signals S23 and S24. The stuffing request circuit 28 outputs a stuffing request signal S28' to the 12 multiplexer 22 upon receiving the phase detection signal S27'.

The 12 multiplexer 22 outputs a normal read clock RD-CLK when the stuffing request signal S28' is not output from the stuffing request signal S28'. In this case, a normal data read is carried out. FIGS. 3a to 3f show timing charts when a normal store and read is carried out.

Figure 4:
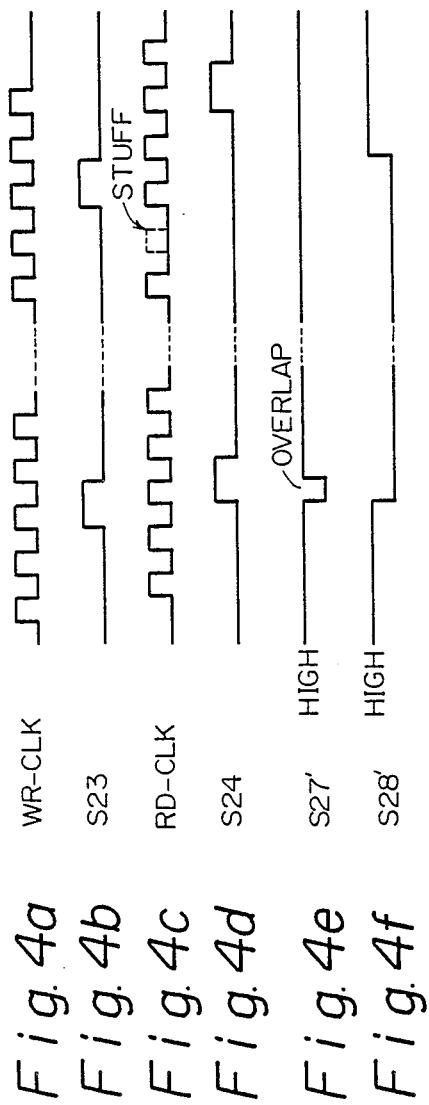

FIGS. 4a to 4f show timing charts when the stuffing is carried out. As shown in FIG. 4c, the 12 multiplexer 22 does not output the last read clock, shown by a dotted line, to adjust the frequency difference between the write clock WR-CLK and the read clock RD-CLK.

Figure 5:
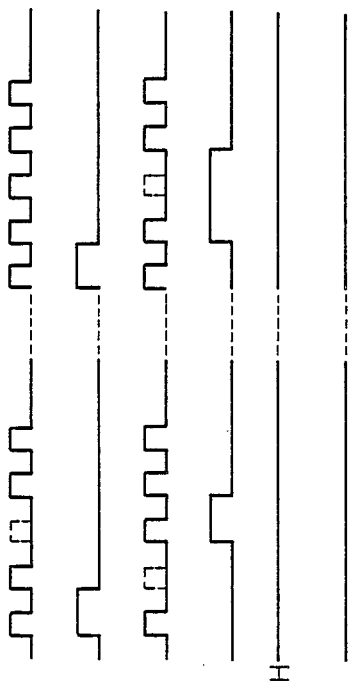
Figure 6:
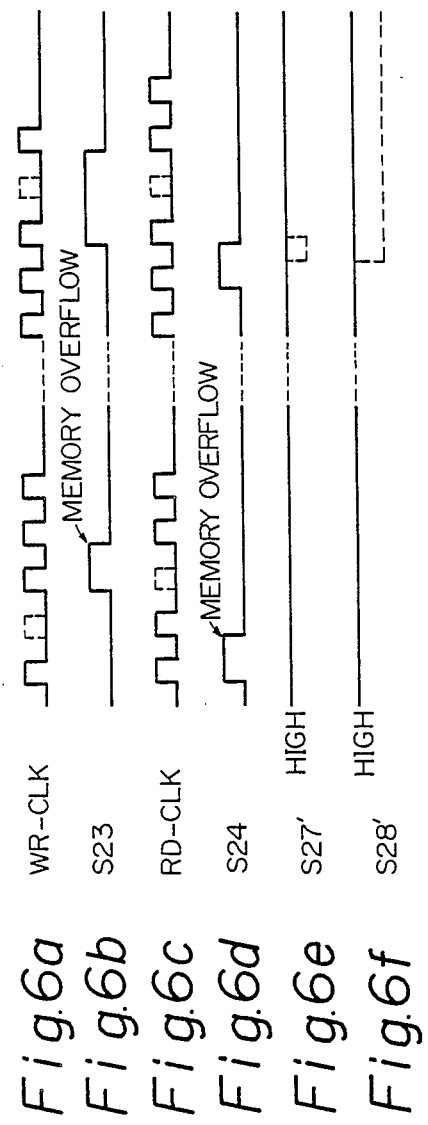

However, the write clock WR-CLK is frequently lost, as shown in FIGS. 5a and 6a. There are several reasons for the loss of a pulse: One is noise and another is the provision of the 1.5 order group between the first order group and the second order group. Namely, the frequency relationships between the first order group and the 1.5 order group and between the 1.5 order group and the second order group do not involve an integer. As a result, the extraction of the write clock is shifted on time. Similarly, the read clock RD-CLK also may be lost, as shown by dotted lines in FIGS. 5c and 6c. If the write and/or read clock are lost, those divided signals are shifted on time, and become wide, as shown in FIGS. 5d and 6b.

As a result, many problems may arise, as follows:
(a) a time shift of the data write and/or the data read. This may lead to an irregular data write and/or data read.
(b) a memory overflow caused by a loss of the write clock WR-CLK and/or the read clock RD-CLK, as shown in FIGS. 6a to 6d.
(c) a loss of the generation of the phase detection signal S27', and thus a loss of the generation of the stuffing request signal S28', as shown by dotted lines in FIGS. 6e and 6f. In this case, the frequency can not be adjusted.

Now, referring to FIG. 7, an embodiment of a digital data multiple conversion system in accordance with the present invention will be described.

Figure 7:
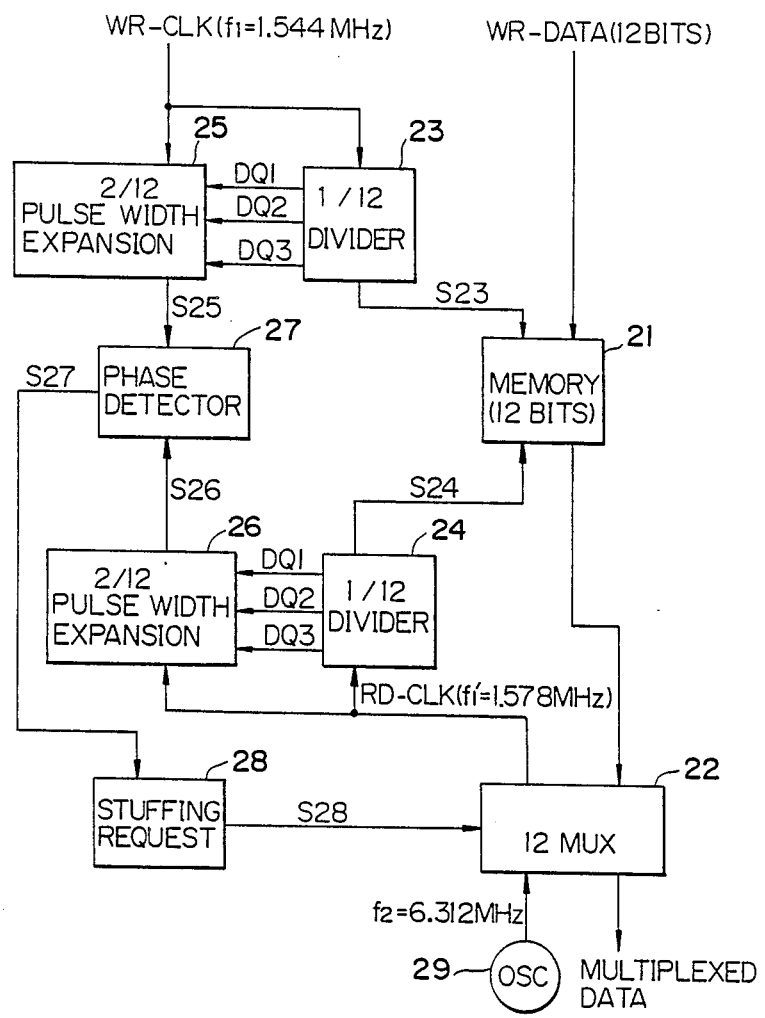
FIG. 7 is a diagram of an embodiment of a digital data multiple conversion system in accordance with the present invention.

The digital data multiple conversion system shown in FIG. 7 is able to multiple-convert data of the first order group and having the frequency $f_1 = 1.544$ MHz into data of the second order group and having the frequency $f_2 = 6.312$ MHz. The digital data multiple conversion system further includes a first pulse width expansion circuit 25 and a second pulse width expansion circuit 26 in addition to the circuits 21, 22, 23, 24, 27, 28, and 29 of the digital data multiple conversion system shown in FIG. 2.

Figure 8:
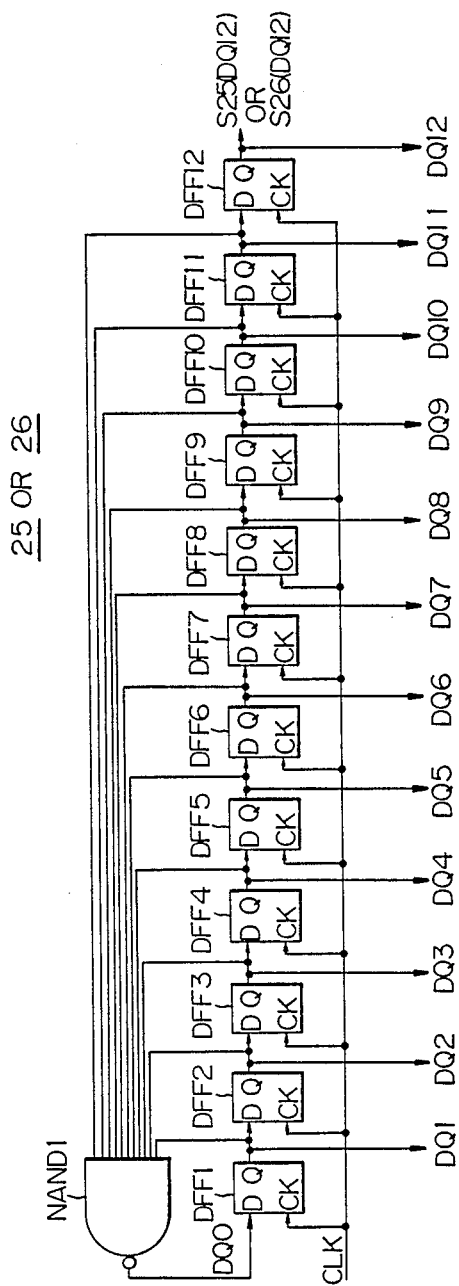
FIG. 8 is a circuit diagram of a frequency divider shown in FIG. 7.

FIG. 8 shows a circuit diagram of a 1/12 frequency divider circuit which can be applied to the first and second frequency dividers 23 and 24. The 1/12 frequency divider circuit shown in FIG. 18 includes 12 series-connected delay-type flip-flops (D-FFs) DFF1 to DFF12 and a NAND gate NAND1. The 1/12 frequency divider circuit shown in FIG. 8 is formed as a ring counter. FIGS. 9a to 9m show timing charts of the 1/12 frequency divider circuit shown in FIG. 8.

The first. 1/12 frequency divider circuit 23 receives the write clock WR-CLK of the frequency $f_1 = 1.544$ MHz, and outputs 12 frequency-divided pulses DQ1 to DQ12 as the first frequency-divided signal S23. The second 1/12 frequency divider circuit 24 also receives the read clock RD-CLK of the frequency $f_1' = 1.574$ MHz from the 12 multiplexer 22, and outputs 12 frequency-divided pulses DQ1 to DQ12 as the second frequency-divided signal S24. In the above, the number 12 corresponds to the bit length 12 of the write data WR-DATA and the read data RD-DATA.

Figure 10:
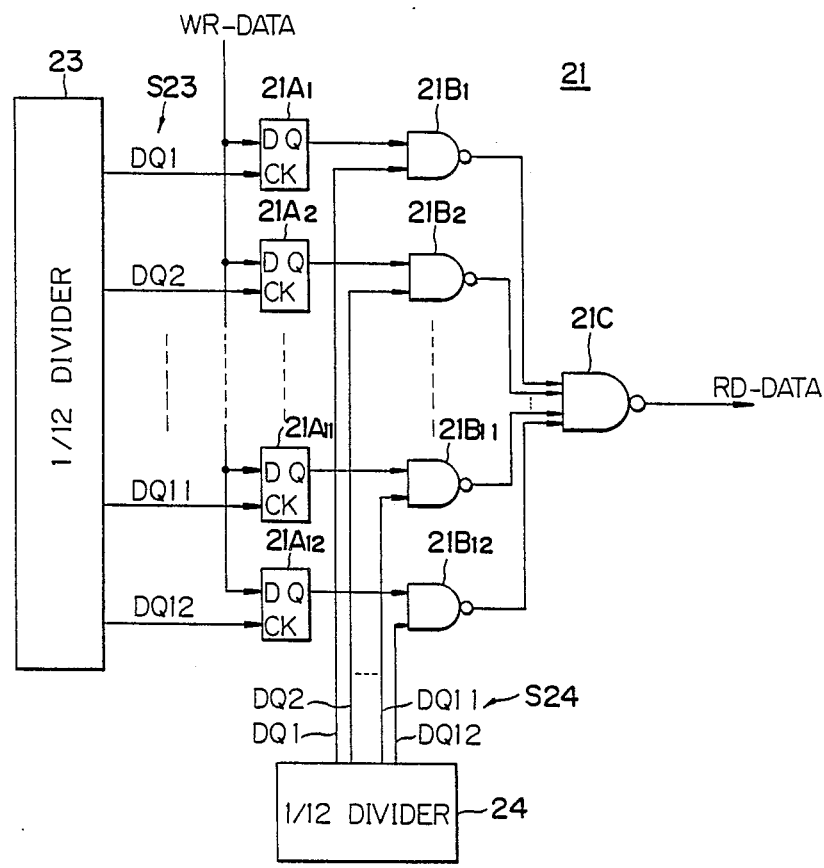
FIG. 10 is a circuit diagram of a memory unit shown in FIG. 7.

FIG. 10 shows a circuit diagram of the memory 21. The memory 21 includes 12 parallel-connected D-FFs 21A$_1$ to 21A$_{12}$, 12 parallel-connected NAND gates 21B$_1$ to 21B$_{12}$, and a NAND gate 21C. The memory 21 receives the serial write data WR-DATA, and stores the same to the parallel-connected DFFs 21A$_1$ to 21A$_{12}$ in response to the 12 frequency-divided pulse train DQ1 to DQ12 as the first frequency-divided signal S23. Thus, the data stored in the DFFs 21A$_1$ to 21A$_{12}$ is parallel data. The stored data in the DFFs 21A$_1$ to 21A$_{12}$ is output to the NAND gate 21C in response to the 12 frequency-divided pulse train DQ1 to DQ12 as the second frequency-divided signal S24. The read data RD-DATA output from the NAND gate 21C is serial data.

Figure 11:
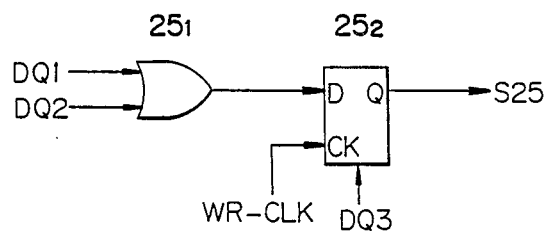
FIG. 11 is a circuit diagram of a pulse expansion circuit shown in FIG. 7.

FIG. 11 shows the pulse width expansion circuit 25. The pulse width expansion circuit 27 includes an OR gate 25$_1$ and a DFF 25$_2$. The OR gate 27$_1$ receives the first and second frequency divided pulses DQ1 and DQ2 of the first frequency-divided signal S23 from the first frequency divider circuit 23. The DFF 25$_2$ receives an output of the OR gate 25$_1$ at a delay input terminal D and is turned ON in response to the write clock WR-CLK. A positive output of the DFF 25$_2$ is supplied to the phase detection circuit 27. The DFF 25$_2$ is cleared by the third frequency-divided pulse DQ3 of the first frequency-divided signal S23. As a result, the pulse width expanded signal S25 has two pulse widths of a pulse width of the frequency divided pulse. FIGS. 12a to 12c show the generation of the pulse width expanded signal S25.

In this example, the pulse width expansion circuit 25 recovers a loss of a single pulse of the write clock WR-CLK.

In this example, the consecutive frequency-divided pulses DQ1 to DQ2 are used for recovering the loss of a single pulse of the write clock WR-CLK except for the frequency-divided pulse DQ3 using the reset of the DFF 252. In general, m consecutive frequency-divided pulses are required for recovering a loss of an (m-1) pulse of the write clock WR-CLK, m consecutive frequency-divided pulses can be replaced at least start and end frequency-divided pulses, a number of pulses therebetween corresponding m.

The second pulse width expansion circuit 26 can be formed in the same way as the first pulse width expansion circuit 25.

Figure 13:
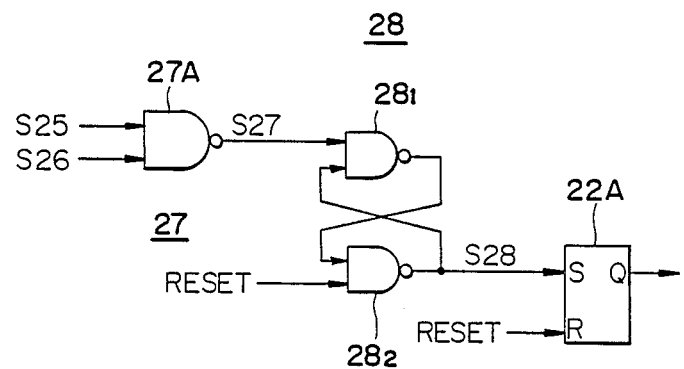
FIG. 13 is a circuit diagram of a phase detection circuit, a stuffing request circuit and a part of a multiplexing unit shown in FIG. 7.

FIG. 13 shows a circuit diagram of the phase detection circuit 27, the stuffing request circuit 28, and a part of the 12 multiplexer 22. The phase detection circuit 27 comprises a NAND gate 27A and receives the first and second pulse width expanded signals S25 and S26, and outputs a low level phase detection signal S27 when both of the received pulse expanded signals S25 and S26 are high level. The pulse width of the phase detection signal S27 is an overlapped ON time of the first and second pulse width expansion signals S25 and S26. The stuffing request circuit 28 comprises two NAND gates 28$_1$ and 28$_2$ to form a latch circuit, and outputs the low level stuffing request signal S28 when the phase detection signal S27 is input. The 12 multiplexer 22 includes a flip-flop 22A, for latching the stuffing request signal S28. Upon receipt of the stuffing request, the stuffing request circuit 28 and the flip-flop 22A are reset by supplying a reset pulse RESET from the 12 multiplexer 22.

Now, the operation of the digital data multiple conversion system shown in FIG. 7 will be described with reference to FIGS. 14a to 14f and FIGS. 15a to 15f.

In FIG. 14a, the write clock WR-CLK is lost at a time t1. However, the pulse width expansion signal S25 has two pulse widths of a single write clock WR-CLK, and as a result, a phase matching between the pulse width expansion signals S25 and S26 is obtained at the phase detection circuit 27, and the stuffing request signal S28 is issued from the stuffing request circuit 28. The 12 multiplexer 22 carries out the stuffing of the read clock WD-CLK at a time t3, regardless of the loss of the read clock WD-CLK at a time t2.

In FIG. 15a, a single pulse of the write clock WR-CLK is lost at a time t11. In FIG. 15c, a single pulse of the read clock RD-CLK is lost at a time t12. These lost pulses lay between adjacent pulse width expansion signals S25, but the number of lost pulses is the same, and thus a normal operation is carried out.

As described above, the digital data multiple conversion system shown in FIG. 7 carries out a normal data multiplexing regardless of the loss of a single pulse of the write data WR-DATA and/or a single pulse of the read data RD-DATA. In addition, the pulse width expansion circuits 25 and 26 are formed by a simple circuit, as shown in FIG. 11.

Figure 16:
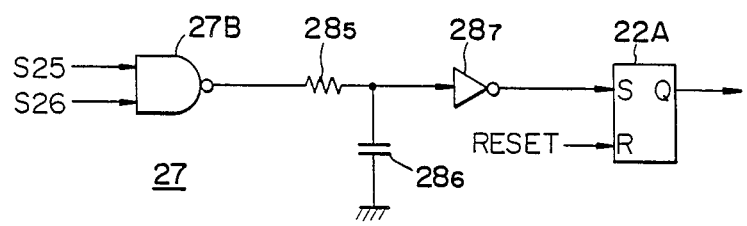
FIG. 16 is a circuit diagram of another stuffing request circuit shown in FIG. 7.

FIG. 16 shows another circuit diagram of the phase detection circuit 27 and the stuffing request circuit 28. The phase detection circuit 27 comprises a NAND gate 27B, and the stuffing request circuit 28 comprises a resister $28_5$, a capacitor $28_6$, and an inverter $28_7$. The resister $28_5$ and the capacitor $28_6$ form a time constant circuit; the time constant thereof being shorter than a period of the frequency-divided signal S23. This analog-type stuffing request circuit 28 does not require the reset pulse RESET from the 12 multiplexer, as shown in FIG. 13.

Figure 17:
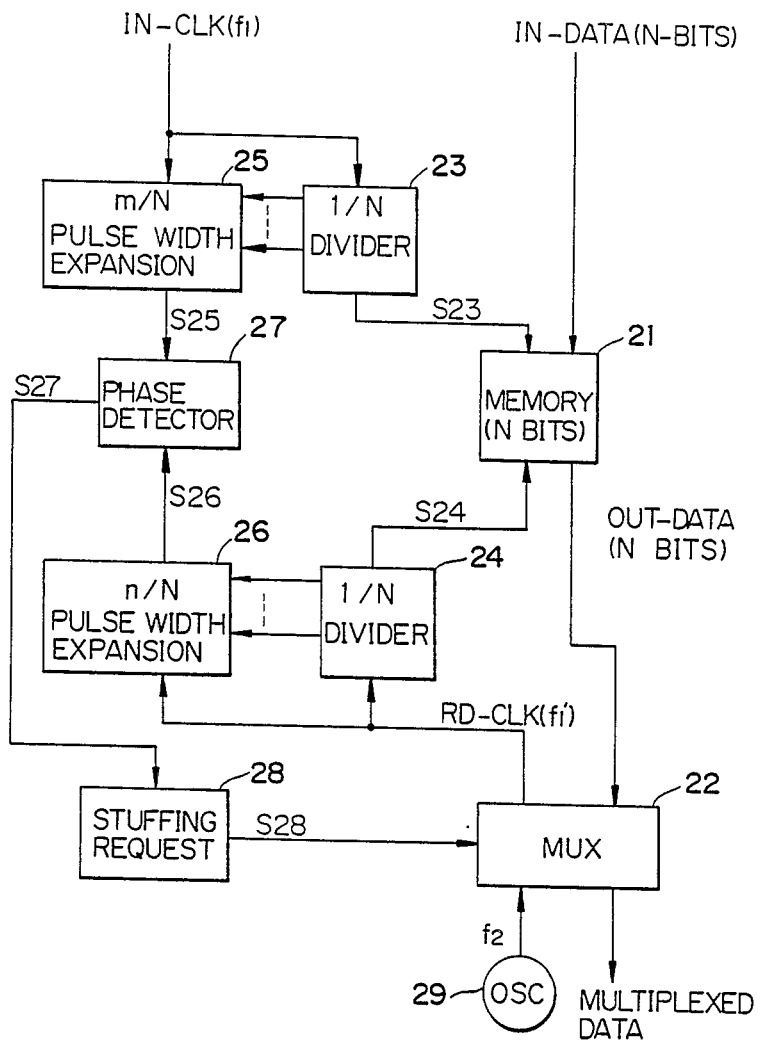
FIG. 17 is a diagram of a general digital data multiple conversion system in accordance with the present invention.

FIG. 17 shows a circuit diagram of a general digital data multiple conversion system. In FIG. 17, reference N indicates a bit length of an input data IN-DATA and an output data OUT-DATA and a frequency dividing factor, and m and n denote pulse widths to be expanded. If the number of lost pulses of an input clock IN-CLK is one, m is two. Similarly, if the number of lost pulses of the read clock RDCCLK is one, n is two.

The digital data multiple conversion system of FIG. 17 can be applied to any portion in the digital data communication network.

Also, the digital data multiple conversion system of FIG. 17 can be applied to a digital data demultiple conversion system by replacing a demultiplexer (not shown) with the multiplexer 22, since the data write at one frequency and the data read at another frequency different to the first frequency are required in the data demultiplexing, and in the demultiplexing, the above lost pulse may be recovered.

Many widely different embodiments of the present invention may be constructed without departing from the spirit and scope of the present invention, and it should be understood that the present invention is not restricted to the specific embodiments described above, except as defined in the appended claims.

We claim:

1. A digital data multiplexing-demultiplexing system comprising:
    a memory unit receiving and storing input data having a bit length of N, N being an integer;
    a first frequency divider receiving an input clock having a first frequency and frequency-dividing the input clock by N to output a first frequency-divided signal;
    a first pulse width expansion circuit connected to receive a plurality of frequency divided pulses which comprise at least start and end frequency divided pulses in a first predetermined frequency division period from the first frequency divider, receiving the input clock, and outputting a first pulse width expanded signal of the input clock, a pulse width thereof corresponding to a number of lost pulses of the input clock pulse plus one;
    a circuit outputting a read clock having a second frequency near to the first frequency and stuffing the read clock;
    a second frequency divider receiving the read clock and frequency-dividing the read clock by N to output a second frequency-divided signal;
    a second pulse width expansion circuit connected to receive a plurality of frequency divided pulses which comprise at least start and end frequency divided pulses in a second predetermined frequency division period from the second frequency divider, receiving the read clock, and outputting a second pulse width expanded signal of the read clock, a pulse having a width corresponding to a number of lost pulses of the read clock pulses plus one;
    a phase detector receiving the first and second pulse width expanded signals, and outputting a phase detection signal when phases of both pulse width expanded signals coincide; and
    a stuffing request circuit receiving the phase detection signal, and outputting a stuffing request signal to the stuffing circuit,
    the memory unit storing the input data in response to the first frequency-divided signal, and outputting the stored data to the stuffing circuit in response to the second frequency-divided signal, and
    the stuffing circuit stuffing the read clock in response to the stuffing request signal.

2. A digital data multiplexing-demultiplexing system according to claim 1, wherein the plurality of frequency divided pulses from the first frequency divider comprise m consecutive frequency divided pulses starting with said start frequency divided pulse during each frequency dividing period of the first frequency divider, where m indicates said number of lost pulses of the input clock plus one, and thus the pulse width of the first pulse width expanded signal has an m +1 pulse width, and
    wherein the plurality of frequency divided pulses from the second frequency divider comprise n consecutive frequency divided pulses starting with a start frequency divided pulse during each frequency dividing period of the second frequency divider, where n indicates a number of lost pulses of the read clock plus one, and thus the pulse width of the second pulse width expanded signal has an n +1 pulse width.

3. A digital data multiplexing-demultiplexing system according to claim 1, wherein the stuffing circuit comprises a data multiplexing circuit.

4. A digital data multiplexing-demultiplexing system according to claim 1, wherein the stuffing comprises a data demultiplexing circuit.

5. A digital data multiplexing-demultiplexing system according to claim 1, wherein the first frequency divider comprises a ring counter circuit, and the second frequency divider comprises a ring counter circuit.

6. A digital data multiplexing-demultiplexing system according to claim 5, wherein the first pulse width expansion circuit comprises a first OR gate circuit receiving m consecutive ring counter outputs, and a first latch circuit receiving an output of the OR gate circuit and outputting the first pulse width expanded signal, and wherein the second pulse width expansion circuit comprises a second OR gate circuit receiving n consecutive ring counter outputs, and a second latch circuit receiving an output of the second OR gate circuit and outputting the second pulse width expanded signal.

* * * * *